United States Patent [19]
Rudolph

[11] Patent Number: 5,825,764
[45] Date of Patent: Oct. 20, 1998

[54] TDMA BASE STATION ARRANGEMENT

[75] Inventor: Colin Rudolph, Carlingford, Australia

[73] Assignee: Alcatel NV, Netherlands

[21] Appl. No.: 631,776

[22] Filed: Apr. 12, 1996

[30] Foreign Application Priority Data

Apr. 13, 1995 [AU] Australia ............................. PN 2401

[51] Int. Cl.⁶ ............................ H04B 7/212; H04B 7/26; H04Q 7/36
[52] U.S. Cl. ...................... 370/337; 455/422; 455/517; 455/561
[58] Field of Search .................................. 370/328, 334, 370/336, 337, 347; 455/422, 426, 500, 507, 517, 526

[56] References Cited

U.S. PATENT DOCUMENTS

| | | | |
|---|---|---|---|
| 5,483,537 | 1/1996 | Dupuy | 370/337 |
| 5,509,014 | 4/1996 | Utting | 370/337 |
| 5,544,171 | 8/1996 | Godecker | 370/337 |
| 5,615,215 | 3/1997 | Utting et al. | 370/337 |
| 5,668,804 | 9/1997 | Suonvieri | 370/331 |

FOREIGN PATENT DOCUMENTS 1773695  12/1995  Australia .

*Primary Examiner*—Hassan Kizou
*Attorney, Agent, or Firm*—Ware, Fressola, Van Der Sluys & Adolphson LLP

[57] ABSTRACT

The area covered by a GSM base station can be increased in concentric rings of 35 km width by co-locating as many GSM transceivers as there are rings, the receivers of the transceivers being delayed by an amount equivalent to the round trip transit time for signals to transverse the inner rings. To enable idle mobiles to access the system each transceiver includes additional auxiliary receivers to receive access bursts on the frequencies of the other transceivers. Thus a mobile can access the system irrespective of the cell in which it is located even though it does not know in which cell it is located.

9 Claims, 1 Drawing Sheet

1

TDMA BASE STATION ARRANGEMENT

TECHNICAL FIELD

This invention relates to an arrangement for providing an extended range TDMA radio communication system, and will be described in the context of the digital GSM cellular radio system.

BACKGROUND OF THE INVENTION

Our earlier, Australian Application PM 6128, U.S. Pat. No. 5,615,215, (hereby incorporated by reference), describes an arrangement for extending the range of a GSM cell to approximately twice the 35 Km radius obtainable by the 63 bit up-link advance specified in the GSM standards. In this arrangement two transceivers are set up to cover a number of concentric areas. The transceiver for the inner area operates at a first frequency pair (up-link and down-link) and has an additional receiver tuned to the up-link frequency of the outer cell but with its channels synchronized to the time base of the inner transceiver. The transceiver for the outer cell operates at a second frequency pair, the down-link being synchronized to the time base of the inner transceiver and the up-link receiver being delayed by the round trip time for the radio signals to traverse the inner cell (~63 bits). In order to ensure that communication can be established with idle mobiles they are forced to camp on the BCCH (Broadcast Control Channel) of the outer cell, preferably by transmitting a "no-camping" message on the BCCH of the inner cell.

However, we have found that in certain circumstances where the outer cell is not fully omnidirectional or does not fully cover the area of the inner cell then idle mobiles within the inner cell but outside the coverage of the outer cell are unable to establish communication because they are barred from camping on the inner cell.

In the GSM system a time frame includes 8 time slots of e.g. 256 bits providing 8 channels. The first transmit or down-link channel is usually reserved for supervision and control functions and is referred to as the Broadcast Control Channel or BCCH. The remaining 7 channels are used for telephone calls. The up-link mobile-to-base station channels are delayed by three time slots with respect to the corresponding down link channel forming a duplex communication.

In our application PM 6128 we describe a pair of such Base Stations but in which the receiver for receiving up-link transmissions from the outer coverage area is delayed by an appropriate amount e.g. 62 bits with respect to the inner receiver.

SUMMARY OF THE INVENTION

This specification describes first and second co-located TDNA transceivers operating on respective first and second up-link and down-link frequencies, the first transceiver including a first transmitter and a first receiver and first auxiliary receiver means, the time frames of the first auxiliary receiver means being in synchronism with the time frames of the first receiver, the first auxiliary receiver means being tuned to the second up-link frequency, and the second transceiver including a second transmitter and a second receiver and second auxiliary receiver means, the time frames of the second auxiliary receiver means being in synchronism with the time frames of the second receiver, the second auxiliary receiver means being tuned to the first up-link frequency.

BEST MODE FOR CARRYING OUT THE INVENTION

Figure 1:
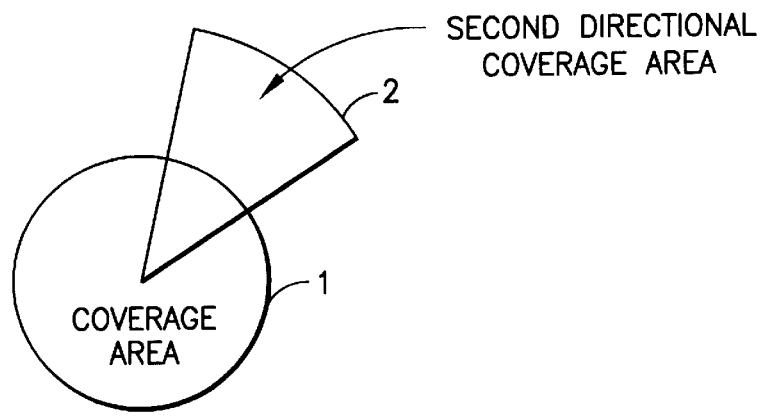
FIG. 1 shows an omnidirectional inner cell and a "pie-slice" outer cell.

FIG. 1 shows a first omnidirectional coverage area and a second directional coverage area 2. The application of the invention, however, is not limited to such an asymmetric arrangement. The invention may be equally applied to concentric omnidirectional cells as well as to other configurations having a pair of co-located cells.

Figure 2:
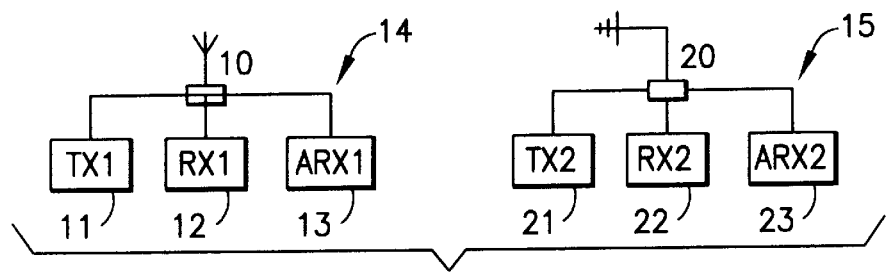
FIG. 2 shows a block diagram representing an arrangement of an omnidirectional cell and a directional cell embodying the invention.

FIG. 2 shows a pair of co-located transceivers 14 and 15. Transceivers 14 has omnidirectional antenna 10 serving coverage area 1 with transmitter TX1 and RX1 operating on respective first down-link and first up-link frequencies, and first auxiliary receiver means ARX1 which operates on the second up-link frequency of transceiver 15.

Transceiver 15 has a directional antenna 20 serving coverage area 2 with transmitter TX2 and receiver RX2 operating on respective second down-link and second up-link frequencies and second auxiliary receiver means ARX2 operating on the first up-link frequency.

Figure 3:
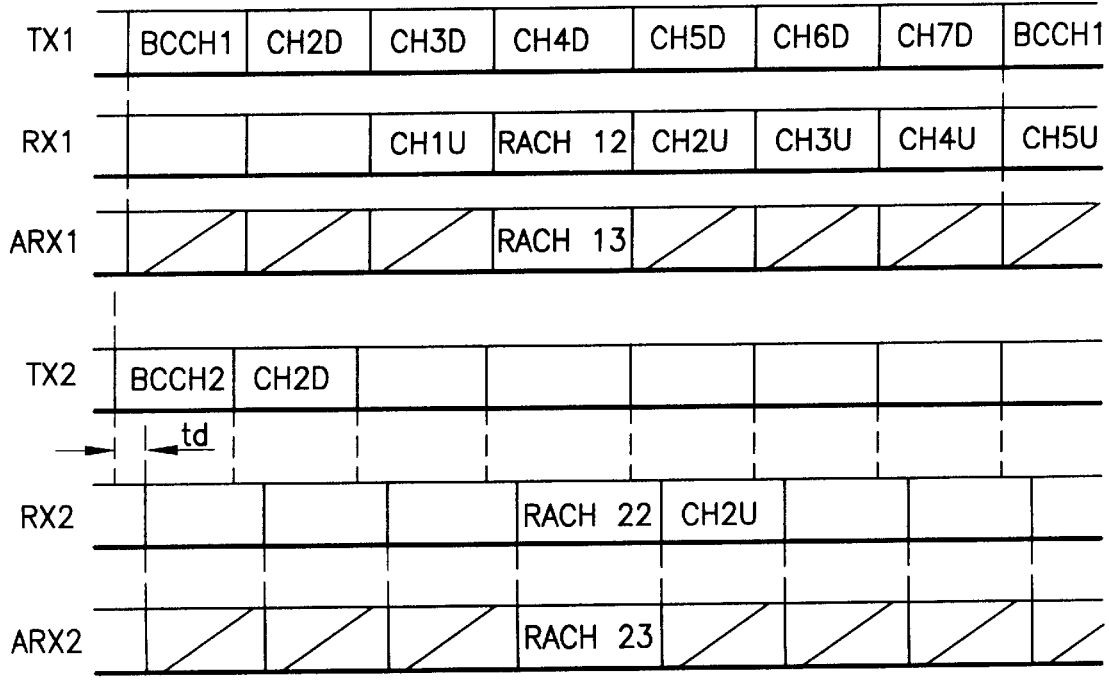
FIG. 3 shows the relative timing of the channels of the elements of the arrangement of FIG. 2.

As shown in the timing diagram of FIG. 3, transmitters TX1 and TX2 operate in synchronism i.e. BCCH1 and BCCH2 start at the same time, and RX1 and ARX1 have their control channels RACH12 and RACH13 delayed with respect to BCCH1 by three time slots but the time slots align in time with time slots of TX1. RX1 operates on the first up-link frequency and ARX1 operates on the second up-link frequency.

However in our example RX2 and ARX2 are delayed by the three time slots plus an additional time delay $t_d$ with respect to TX2 and hence TX1. The additional $t_d$ may in fact be zero in the instance where coverage area 2 is totally within coverage area 1. This may be necessary where the base stations are located on the top of a hill and the elevation of antenna 10 is such that there is an area close to the foot of the antenna 10 which is not covered effectively by the radiation pattern of antenna 10.

In such a case antenna 20 may be directed to a lower elevation to provide near field coverage for the radio shadow area of antenna 10.

In a further application $t_d$ may be, e.g., 62 bits to provide an extended coverage area of approximately 70 km in a specific direction.

The benefits of this arrangement are that both transceivers now include identical equipment, simplifying requirements for the manufacturer who can now produce a single standard type of equipment. In addition it is no longer necessary to force idle mobiles to camp on the outer cell frequency by transmitting a "no-camping" signal on the inner cell BCCH. Thus, idle mobiles can rove freely within either coverage area and still be able to set up calls.

For example, in the case where coverage area 2 extends to 70 Km, an idle mobile outside coverage area 1 but inside coverage area 2 is able to send an access request on either the first or second up-link frequency and it will be received by either ARX2 of RX2 respectively because these receivers are delayed by 62 bits thus permitting the request to be received in time slot RACH23 or RACH22 respectively.

Similarly a mobile anywhere in coverage area 1 can send an access request on either the first or second up-link frequencies and this will be received by RX1 or ARX2 respectively in time slots RACH12 or RACH13.

Random access requests are shorter than the full time slot so that even when delayed by the full 63 bits they can still be received within a random access channel (RACH).

The arrangement is in theory adaptable to any number of concentric cells up to the limit of radio range from the base station tower. However a direct application of the arrangement to n concentric cells would require n×n receivers. That is each receiver would need to be capable of receiving access bursts on each of the other n−1 cell frequencies as well as its own.

In practice, one way of avoiding the need for so many receivers would be to make use of the ability of the mobile receiver to discriminate between the strengths of the signals which it receives. While such discrimination may not be entirely reliable in areas where there are radio obstacles such as buildings or hills to cause multi-path fading, this problem is not so serious on more level ground where the multiple cell arrangements would find greatest use.

Thus techniques such as beam tilting and transmitter power differentiation may be applied to reduce the number of auxiliary receiver means required for each cell. A further technique to differentiate between the signal strengths from each cell's base transmitter antenna is to place the antennae at increasing heights as the cells' service areas are located further from the centre of the set of concentric cells. Thus the signals from the inner cells' antennae which are located at the lower positions would have a shorter range than the signals from the outer cells' antennae which are located higher up on the mast.

In addition, a beam shape may be optimized electronically or mechanically to reduce the overlap of propagation patterns.

By using one or more of these techniques, the mobile stations are able to more readily distinguish between the cell broadcast channels so that they will attempt to access on only those cells in their immediate vicinity. The mobiles achieve this by analysing the signal strengths of the base station signals which it receives. The signal strengths received from the various transmitters by a mobile in any cell can thus be adjusted by the above techniques to increase the probability that the mobile will attempt to access the appropriate base transceiver for the cell area in which the mobile is located. Thus the need for the base transceivers to be able to receive access bursts on all other frequencies used by the co-located transceivers, for instance where there are four cells C1, C2, C3, and C4 in order from the centre, may be sufficiently achieved if:

C1 can receive access bursts for C1 and C2;

C2 can receive access bursts for C1, C2 and C3;

C3 can receive access bursts for C2, C3 and C4; and

C4 can receive access bursts for C3 and C4.

That is, each cell transceiver is adapted to receive access bursts for its geographically immediately adjacent cells.

The claims defining the invention are as follows:

I claim:

1. A TDMA base station arrangement to enable mobile transceivers to maintain communication with a base station outside the range defined by the limit of relative time adjustment of the transmissions between the mobile transceivers and the base station, the arrangement including first and second substantially co-located base transceivers operating on respective first and second up-link and down-link frequencies, the first base transceiver including a first transmitter and a first receiver and a first auxiliary receiver, the time frames of the first auxiliary receiver being in synchronism with the time frames of the first receiver, the first auxiliary receiver being tuned to the second up-link frequency so as to allow receipt of access bursts from an idle mobile transceiver operating on said second up-link frequency, and the second base transceiver including a second transmitter and a second receiver and a second auxiliary receiver, the time frames of the second auxiliary receiver being in synchronism with the time frames of the second receiver, the second auxiliary receiver being tuned to the first up-link frequency so as to allow receipt of access bursts from an idle mobile transceiver operating on said first up-link frequency.

2. An arrangement as claimed in claim 1, wherein the time frames of the first and second auxiliary receiver are delayed by a predetermined time delay of the order of the round trip delay of radio signals over a predetermined distance.

3. A digital mobile telephone base station arrangement including two or more co-located base transceivers, each transceiver operating on a corresponding up-ink and down-link frequency, each base transceiver including a transmitter and a main receiver being arranged to communicate with a corresponding one of a plurality of concentric coverage areas by including a delay of the main receiver with respect to the associated transmitter sufficient to allow for the round trip signal transit time to the inner edge of the corresponding coverage area, wherein each transceiver includes one or more additional receivers synchronized to its main receiver, wherein at least one of the additional receivers of each base station is tuned to receive an access burst on the up-link frequency of an adjacent coverage area so as to allow receipt of access bursts from an idle mobile transceiver in said adjacent coverage area.

4. An arrangement as claimed in claim 3, wherein each transceiver other than those for the innermost and outermost coverage areas includes two additional receivers, each additional receiver is tuned to a different one of the adjacent coverage areas so as to receive an access burst on the up-link frequency of said different adjacent coverage area.

5. An arrangement as claimed in claim 3, wherein each transceiver includes an additional receiver for each of the other co-located transceiver up-link frequencies so as to receive an access burst on said corresponding up-link frequency.

6. An arrangement as claimed in claim 5, wherein the signal strengths of the down-link signals of at least some of the transceivers at their corresponding coverage areas are differentiated.

7. An arrangement as claimed in claim 6, wherein the signal strengths are differentiated by one or more of the following:

I) beam tilting;

ii) antennae height:

iii) transmitter power:

iv) beam shaping.

8. A method of providing two or more co-located digital mobile telephone transceivers covering corresponding concentric coverage areas;

each transceiver including a transmitter operating on a corresponding down-link frequency and a main receiver operating on a corresponding up-link frequency;

delaying each receiver by an amount which takes into account the signal round trip delay to the inner edge of the corresponding coverage area;

providing each transceiver with one or more additional receivers synchronized to its main receiver;

tuning each additional receiver to up-link frequencies of the other transceivers so as to receive access bursts from an idle mobile transceiver operating on any up-link frequency of the other concentric coverage areas.

9. A method as claimed in claim 8, wherein one of the additional receivers is tuned to the up-link frequency of an adjacent coverage area's transceiver.

* * * * *

UNITED STATES PATENT AND TRADEMARK OFFICE
CERTIFICATE OF CORRECTION

PATENT NO. : 5,825,764
DATED : October 20, 1998
INVENTOR(S) : Colin Rudolph

It is certified that error appears in the above-identified patent and that said Letters Patent is hereby corrected as shown below:

In Column 4, line 27 (Claim 3, line 3) "up-ink" should be --up-link--.

Signed and Sealed this

Second Day of March, 1999

Attest:

Q. TODD DICKINSON

*Attesting Officer*  *Acting Commissioner of Patents and Trademarks*